Patented Apr. 1, 1941

2,237,090

UNITED STATES PATENT OFFICE 2,237,090

TREATMENT OF CEREAL PRODUCTS

Arno Richard Sasse, Minneapolis, Minn., assignor to Standard Milling Company, New York, N. Y., a corporation of Delaware No Drawing. Application May 28, 1934, Serial No. 727,911

17 Claims. (Cl. 99—80)

This invention relates to the treatment of cereal products for the purpose of intensifying and preserving the natural color of the cereal products.

Certain cereal products, such as durum wheat, are naturally of a yellow or amber color and it is highly desirable to retain the coloring material, which is chiefly carotin, and the resulting color in the finished product. It is well known that such products become lighter in color after storage under ordinary storage conditions and in many cases the treatment to which the cereal product is subjected has a bleaching action. Products milled from newly harvested wheat are decidedly more yellow than products milled from the same wheat six months later, thus making a variation in the appearance of the product, and the content of coloring material, throughout the crop year.

It is an object of the present invention to provide a method of treatment whereby the natural yellow or amber color of the cereal product may be preserved and intensified. A further object is to provide a method whereby a greater uniformity of color may be obtained in the finished product. Other objects will become apparent.

I have found that by subjecting a cereal or a cereal product (for example, such as durum wheat or the milled product resulting therefrom) to the action of a substance adapted to slightly reduce the acidity of the cereal or cereal product, the natural color of the cereal may be retained or intensified in the finished product, thus preventing or retarding the bleaching which normally takes place in the preparation of such products and giving to the product the yellow or amber color of the natural cereal, or intensifying the same.

In describing the invention, reference will be made to a preferred example, although it is not intended to restrict the invention to the particular example given.

The cereal, for example, durum wheat, may be subjected to the action of a tempering bath containing a small amount of ammonia gas or other alkaline material in such quantities as to increase the pH of the wheat by about 0.1 to 0.2, or, for instance, from about 6.5 to about 6.6 or 6.7. In order to accomplish this with ammonia gas, approximately 25 to 50 parts by weight of ammonia gas may be added in the full stream of water necessary for tempering one million parts by weight of wheat. The wheat, after being subjected to the tempering treatment described above, is allowed to remain in a bin from 4 to 5 hours before milling. The product is then milled and the milled product or "middlings" or semolina is preferably subjected to the action of ammonia gas in an agitator in the presence of the natural moisture of the product (about 14% moisture) or in the presence of additional moisture in the form of moist air or water vapor. This may be accomplished by passing the cereal product downwardly through a baffled shoot and passing a stream of ammonia gas counter current to the stream of cereal product. The evaporation of water from the grain product may furnish sufficient moisture or additional moisture may be added. Approximately 35 to 75 parts by weight of ammonia gas are used in this operation per million parts by weight of the middlings.

The procedure described above may be varied in many respects. For example, the amount of ammonia gas, or other alkaline material, used in the tempering of the grain may be increased to such an extent that only a small quantity or no ammonia gas will be required in the subsequent treatment of the product. Or, the ammonia gas, or other alkaline material, may be omitted in the tempering step, the quantity of ammonia gas used for the subsequent treatment of the cereal product being raised to approximately 50 to 100 parts by weight per million parts by weight of the product. I prefer, however, to use the ammonia in both the tempering step and in the treatment of the milled cereal.

Where the wheat is subjected to a tempering liquid containing ammonia, or other alkaline material, I prefer to use such a quantity of ammonia as to raise the pH of the wheat from an initial value of about 6.5 to a value of about 6.7. The milled grain product is of lower pH than the grain from which it is milled and is then subjected to the action of ammonia gas, or other alkaline material, in such proportions that the pH of the grain product will be raised about .1 to .2 or, for example, from approximately 6.2 to 6.3 or 6.4. Where the milled product is not subjected to treatment with ammonia gas, or other alkaline material, the pH of the wheat subjected to tempering should be increased to about 6.8. By operating at this higher pH, however, the wheat has a tendency to produce middlings that are not as sharp or granular as when milled at a pH of 6.6 or 6.7 (that is, when the pH is raised by 0.1 to 0.2). If less or no ammonia or other alkaline material is added to the tempering water, larger amounts of ammonia gas will be required in the treatment of the finished product.

As indicated above, other alkaline materials may be substituted for the ammonia gas in the tempering step or subsequent treatment. For example, sodium hydroxide, sodium carbonate, sodium bicarbonate, trisodium phosphate or other suitable caustic alkalis or alkaline salts may be used for this purpose, the pH being maintained at about the values given above. I prefer, however, to use the ammonia gas for this purpose.

The middlings, when treated as above described, may be ground to flour and will retain the natural yellow or amber color of the cereal or will be of intensified color.

It is apparent that many modifications may be made in the procedure described above and that the procedure may be applied to other products than those specifically mentioned. For example, the flour or middlings as semolina or farina may be treated with ammonia gas, the yellow color being increased in proportion to the increase in pH resulting from the quantity of ammonia used. Or the alkaline treatment may be used to advantage in the preparation of paste or dough from middlings or flour by raising the pH of the paste or dough. The pH in such cases, however, is maintained preferably below a pH of 7.

In using the term grain product in the appended claims it is intended to include the cereal and grain itself as well as the intermediate and final grain products such as the middlings, semolina or farina and the flour or the dough or paste prepared from the middlings or flour.

The terms used in describing the invention have been used in their descriptive sense and not as terms of limitation and it is intended that all equivalents thereof be included within the scope of the appended claims.

What I claim is:

1. A method for preparing grain products containing sufficient amounts of carotin to give a naturally yellow or amber color comprising treating the grain product with sufficient quantity of an alkaline material to increase the pH of the grain product by not less than 0.1 and to less than a pH of 7.0.

2. A method as defined in claim 1 in which the alkaline material is a compound of the group consisting of hydroxides, carbonates, and phosphates of alkali elements and ammonia.

3. A method as defined in claim 1 in which the alkaline material is ammonium hydroxide.

4. A method as defined in claim 1 in which the pH of the grain product is increased to not over about 6.7 to 6.8.

5. A method as defined in claim 1 in which the grain product is treated in the presence of moisture with about 50 to 100 parts by weight of ammonia per million parts by weight of the grain product.

6. A method for preparing grain products containing sufficient amounts of carotin to give a naturally yellow or amber color comprising tempering the grain in an alkaline solution adapted to increase the pH of the grain by about 0.1 to 0.2 and subsequently treating the grain product with an alkaline material adapted to increase the pH by about 0.1 to 0.2, the pH being maintained at all times below a pH of 7.0.

7. A method as defined in claim 6 in which the alkaline materials used are of the group consisting of hydroxides, carbonates and phosphates of alkali elements and ammonia.

8. A method as defined in claim 6 in which the alkaline material is ammonium hydroxide.

9. A method as defined in claim 6 in which the grain is treated with a solution containing about 25 to 50 parts by weight of ammonia gas per million parts by weight of grain and the grain product is treated in the presence of moisture with about 35 to 75 parts by weight of ammonia gas per million parts by weight of grain product.

10. A method as defined in claim 6 in which the quantity of alkaline material in the tempering is such as to raise the pH of the grain to about 6.6 to 6.7 and the milled product of the grain, which is of lower pH than the grain from which it is milled, is treated with an alkaline material to produce an increase in pH from about 6.2 to about 6.3 to 6.4.

11. A method for preparing durum wheat products comprising treating a durum wheat product in the presence of moisture with about 50 to 100 parts by weight of ammonia gas per million parts by weight of the wheat product.

12. A method for preparing durum wheat products comprising tempering the wheat in a solution containing about 35 to 50 parts by weight of ammonia gas per million parts by weight of wheat, thereafter treating the wheat middlings in the presence of moisture with about 35 to 45 parts by weight of ammonia gas per million parts by weight of wheat middlings.

13. A method for retaining the natural color of durum wheat products comprising tempering the wheat in a solution adapted to raise the pH of the wheat to about 6.6 to 6.7, and thereafter subjecting the wheat middlings in the presence of moisture with sufficient ammonia gas to increase the pH of the wheat middlings by about 0.1 to 0.2.

14. A method as defined in claim 13 in which the tempering solution contains about 35 to 50 parts by weight of ammonia gas per million parts by weight of wheat.

15. The process of intensifying the color of durum wheat products which consists in introducing ammonia gas directly into the material while in confinement.

16. The process of intensifying the color of durum wheat products which comprises contacting the durum wheat product directly with ammonia gas while agitating the mixture.

17. The process of intensifying the color of durum wheat products which comprises contacting the durum wheat product directly with ammonia gas in the presence of moisture and while agitating the mixture.

ARNO RICHARD SASSE.